United States Patent [19]

Gerritsen et al.

[11] Patent Number: 5,048,925
[45] Date of Patent: Sep. 17, 1991

[54] QUASI VOLUME DIFFRACTING STRUCTURES

[75] Inventors: Hendrick J. Gerritsen, Providence, R.I.; Richard Ian, Brookline, Mass.; Elisabeth W. King, Woolwrich, Me.; Donald K. Thornton, East Boston; Sally N. Weber, North Cambridge, both of Mass.

[73] Assignee: Advanced Environmental Research Group, Woolwrich, Me.

[21] Appl. No.: 193,134

[22] Filed: Apr. 29, 1988

Related U.S. Application Data

[63] Continuation of Ser. No. 738,300, May 28, 1985, abandoned.

[51] Int. Cl.$^5$ .......................... G02B 5/18; G02B 17/00
[52] U.S. Cl. ..................................... 359/569; 359/566; 359/593
[58] Field of Search ................................ 350/3.7–3.73, 350/162.17–162.22, 259, 260, 3.77

[56] References Cited

U.S. PATENT DOCUMENTS 3,482,107  12/1969  Hock .............................. 350/162.17
4,103,153   7/1978  Matsumoto ..................... 350/162.17

FOREIGN PATENT DOCUMENTS 1546333  11/1968  France ........................... 350/162.17

OTHER PUBLICATIONS

Welford, W. T. et al., "Nonconventional Optical Systems and the Brightness Theorem", *Applied Optics*, vol. 21, No. 9, pp. 1531–1533, May 1982.
Ludman, J. E., "Holographic Solar Concentrator", *Applied Optics*, vol. 21, No. 17, pp. 3057–3058, Sep. 1982.
Collier et al., *Optical Holography*, Academic Press, N.Y., 1971, pp. 12–14.
Weber, P. I., et al., "Holographic Windows for Architectural Daylighting and Energy Conservation", Photonics, Inc., Feb. 1984, pp. 1–21.

*Primary Examiner*—Paul M. Dzierzynski
*Assistant Examiner*—James Phan
*Attorney, Agent, or Firm*—Robert F. O'Connell

[57] ABSTRACT

A structure for responding to incident radiation for directing said radiation in a selected direction with respect to the structure, the structure using at least two outer diffraction elements and an intermediate diffraction element, the diffraction characteristics being selected so that the selected direction remains within relatively limited confines independent of the angles of incidence of the incoming radiation over a selected range thereof.

10 Claims, 3 Drawing Sheets

QUASI VOLUME DIFFRACTING STRUCTURES

This is a continuation of co-pending application Ser. No. 738,300 filed on May 28, 1985, now abandoned.

INTRODUCTION

This invention relates generally to diffracting structures and, more particularly, to diffracting structures which are capable of responding to incoming radiation over a wide range of wavelengths incident thereon from directions within a wide range of incidence angles and of handling such radiation in a specified manner such as by directing the incident radiation toward a selected narrow range of directions which remains substantially the same, i.e., within relatively limited confines, independent of changes in incidence angle for the wavelength range over which the structure is designed to respond.

BACKGROUND OF THE INVENTION

Certain light transmitting structures have been proposed for use in responding to input incidence radiation and directing such radiation toward a generally defined direction. For example, holographic window structures have been proposed for responding to sunlight radiation and for directing such radiation in a selected direction toward a desired interior region of a room for illumination thereof. One of the problems with such structures has been that, as the angle of incidence of the incoming sunlight radiation, for example, changes, either in azimuth or elevation, or both, the direction of the illuminating radiation changes within the room. However, it would be desirable to construct such a window structure so as to prevent such changes in output direction even though the input angles of incidence of the incoming radiation change over a relatively wide range.

When certain planar holograms, for example, generally referred to by those in the art as "thin" holograms, are used for redirection purposes it has been found that changes in the direction of the output radiation are particularly noticeable as the incidence angle of the incoming radiation changes, even though such thin hologram devices tend to accept incoming radiation over a rather wide range of input incidence angles and over a reasonable bandwidth of wavelengths.

When other types of holograms, generally referred to by those in the art as "volume" holograms, i.e., structures having a thickness substantially greater than the thin holograms mentioned above, are used, it is possible to transmit such radiation in a direction toward an interior region which tends to remain within relatively limited confines independent of the incidence angle of the incoming radiation. However, such "volume" hologram devices tend to respond to incoming radiation only over a relatively narrow range of input incidence angles and only over a relatively narrow bandwidth of wavelengths.

Moreover, such holograms are made "holographically", i.e., by using a conventional laser wave interference technique, which technique has the disadvantage of being an expensive method for producing such devices on a large scale production basis.

Accordingly, the use of a conventional thin hologram or a conventional volume hologram is not feasible where such devices are required to respond to radiation over a wide band of wavelengths and over a wide range of incidence angles and to handle such radiation in a specified manner as by directing the radiation in a selected direction which remains relatively constant or within relatively limited confines independent of the wavelength and angle of incidence of the incoming radiation. It is desirable to be able to devise a structure which can do so in a cost-effective manner and which can be mass produced at reasonable cost.

BRIEF SUMMARY OF THE INVENTION

In accordance with the invention a diffracting structure is formed utilizing a plurality of layers, or laminations, of structural elements each having diffracting characteristics selected so as to control the radiation transmitted through the structure in a selected manner. A typical three-layer embodiment of the invention includes two outer diffracting elements, each having, for example, a selected topographical diffraction relief pattern formed on at least one surface thereof, and an intermediate element having a selected topographical diffraction relief pattern formed on at least one surface thereof positioned between them. In a preferred embodiment thereof, the intermediate element has an index of refraction which is selected to be significantly different from the index of refraction of either of the two outer structural elements. In one embodiment, for example, a desired topographical surface relief pattern can be formed by embossing techniques using a pattern generated on a master stamping element through the use of known holographic and etching techniques. Alternatively, such relief pattern can be formed, for example, by the use of a ruling machine as is known in the art in making masters for spectrographic diffraction gratings. The master element can then be used to replicate the desired pattern on whatever surfaces it is to be placed. Such a layered, or laminated, structure is found to respond to incoming radiation over a relatively wide range of input incidence angles and over a relatively wide band of wavelengths and, when used as a window structure, for example, to direct such radiation toward a selected direction which remains within relatively limited confines independent of changes in the angle of incidence of the incoming radiation over a wide range thereof and for all visible wavelengths.

DESCRIPTION OF THE INVENTION

The invention can be described in more detail with the help of the accompanying drawings wherein FIG. 1 shows a view in section of a diffracting element for use in an embodiment of the invention;

Figure 1:
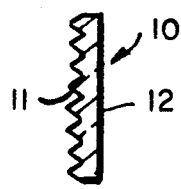

As can be seen in the particular embodiment of FIG. 1, a diffracting element 10 is formed so as to provide on one of its surfaces a topographical surface relief pattern 11, while the other surface 12 contains no relief pattern. Such an element can be fabricated using known techniques wherein a master embossing or stamping element, for example, can be formed, as discussed above, using both known holographic techniques (e.g., laser interference waves) and appropriately known etching techniques for such purpose. The master element then has, for example, an inverse pattern of that desired for the topographical relief pattern to be formed on each of the replicated elements. Such master element can be used in an embossing technique, for example, for stamping out multiple replications of the desired topographical relief pattern on at least one surface of a plurality of diffracting elements. The techniques for forming a master element using holographic techniques and for embossing replications thereof for such purpose have been described, for example, in U.S. Pat. No. 3,746,783, issued to H. J. Gerritsen et al. on July 17, 1973.

While a desired master diffraction relief pattern can be formed using the above mentioned holographic/etching techniques, other techniques may also be used by those in the art for such purpose. For example, photoresist techniques, ion beam etching, mechanical cutting with a ruling machine, and the like, could also be used to form a suitable topographical diffraction relief pattern, as in the form of a diffraction grating, for example. The particular dimensions of the relief pattern, e.g. the spacings between the raised portions of a grating and the heights thereof, are in the same order of magnitude as the wavelengths of the incoming radiation with which the elements are to be used (e.g., wavelengths in the visible part of the spectrum) and will depend on the applications in which the overall device is used.

Figure 2:
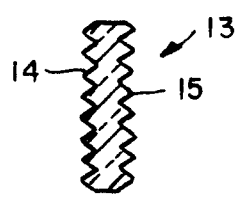
FIG. 2 shows a view in section of another diffracting element for use in an embodiment in the invention.

Alternatively, a diffracting element of the type shown in FIG. 2 can be so formed wherein a structural element 13 has appropriate topographical diffraction relief patterns 14 and 15 formed on both of its surfaces.

Figure 3:
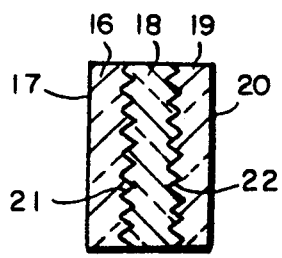
FIG. 3 shows a view in section of an exemplary embodiment of a laminated diffracting structure in accordance with the invention.

Elements of the type shown in FIGS. 1 and 2 can be utilized in the formation of a typical overall device in accordance with the invention as shown in FIG. 3. Thus, a first element 16 having a topographical diffraction relief pattern 21 on one of its surfaces and an element 19 having a topographical diffraction relief pattern 22 on one of its surfaces are positioned so as to have an intermediate element 18 positioned therebetween. Element 18 is selected so as to have an index of refraction which is substantially different from the index of refraction of either diffracting element 16 or diffracting element 19. The outer surfaces 17 and 20 of the latter elements in the particular example shown, for example, may be ones which do not have any topographical diffraction relief patterns formed thereon and such structure represents a preferred embodiment.

In such a structure the interior or intermediate element 18 may be formed of a plastic material, such as an epoxy or a cyanoacrylic or of a finely powdered inorganic material in a suitable binder, one such material being available under the trade name IRTRAN ® from Eastman Kodak Company of Rochester, N.Y. In one embodiment such material is placed into position in its fluid or quasi-fluid state and, when hardened, becomes directly bonded to the relief pattern surfaces 21 and 22 of elements 16 and 19 so as to fill in the depressed portions thereof prior to hardening as shown. Accordingly, the surfaces of such intermediate element also have diffraction characteristics while the material itself acts as a bonding or adhesive element for adhering to the outer elements 16 and 19.

Figure 4:
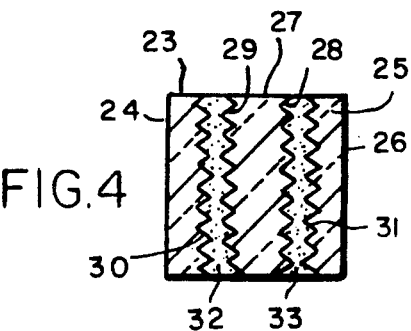
FIG. 4 shows a view in section of an alternative exemplary embodiment of a laminated diffracting structure in accordance with the invention.

An alternative preferred embodiment of such a structure is shown in FIG. 4 wherein a pair of outer diffracting elements 23 and 25 having topographical diffraction relief patterns 30 and 31 on the inner surfaces thereof and smooth, non-topographical outer surfaces are utilized together with an intermediate diffracting element 27 having topographical diffraction relief patterns 28 and 29 on both surfaces thereof. In this case, intermediate element 27 is formed of a material which does not in and of itself bond to outer elements 23 and 25 and, accordingly, relatively thinner layers 32 and 33 of a suitable adhesive are utilized to bond intermediate element 27 to the relief surfaces of elements 23 and 25. The relief patterns formed on surfaces 28 and 29 of intermediate element 27 can be arranged generally to conform to the topographical relief patterns 30 and 31, respectively, of the outer elements 23 and 25. In the particular embodiment of FIG. 4, the outer surfaces 24 and 26 are not formed with any relief patterns thereon. In such a structure the adhesive layers may contribute to the diffracting characteristics of the overall structure in which case the index of refraction of the adhesive layers may be selected to be different from that of either the outer elements 23 and 25 or the intermediate element 27. In such case, the overall device might be thought of as a five-layer structure. Although the adhesive layers preferably can be used to contribute to the overall diffracting characteristics, alternatively the adhesive layers in some applications may be arranged to have indices of refraction which match those of the outer layers, for example, so that little or no contribution to the overall diffracting characteristics is achieved therefrom.

Figure 5:
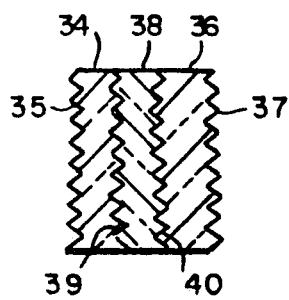
FIG. 5 shows a view in section of a further alternative exemplary embodiment of a laminated diffracting structure in accordance with the invention.

A further alternative embodiment in accordance with the invention is shown in FIG. 5 wherein the outer elements 34 and 36 have topographical diffraction relief patterns formed on both of their surfaces 35, 39, 37 and 40, respectively. Intermediate element 38 is then formed in the same manner, for example, as that of FIG. 3 wherein the element itself is utilized both as a diffracting element and as a bonding element to bond to elements 34 and 36. As before, the index of refraction of element 38 is selected to be substantially different from the indices of refraction of either outer elements 34 and 36. Alternatively, intermediate element 38 may be bonded to outer elements 34 and 36 using separate adhesive layers as shown in FIG. 4.

Figure 6:
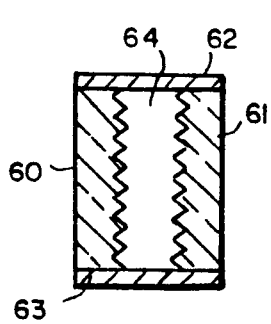
FIG. 6 shows a view in section of a further alternative embodiment using diffracting topographical relief elements having air as an intermediate element therebetween.

In a still further embodiment shown in FIG. 6 outer elements 60 and 61 may be appropriately supported externally as by support means 62 and 63 attached to the upper and lower portions thereof as shown and separated by an air gap 64 therebetween. In such embodiment the air acts as an intermediate element, having an index of refraction substantially different from those of elements 60 and 61, to provide the desired stacked diffraction operation.

Figure 7:
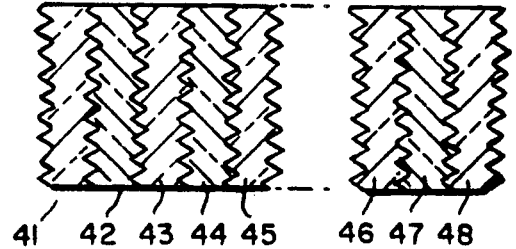
FIG. 7 shows a view in section of a still further exemplary embodiment of a diffracting structure in accordance with the invention.

The three element structures of FIGS. 3-6 can be extended further to form other multiple element structures such as that depicted in FIG. 7 having a selected plurality of laminations greater than three as desired. In each case alternating elements, e.g., elements 41, 43, 45 ... 46 and 48 illustrated in FIG. 7, can be thought of as equivalent to the outer elements of FIGS. 3-5 while the elements therebetween, i.e., intermediate elements 42, 44 ... and 47 can be thought of as being equivalent to the intermediate elements of FIGS. 3-6. In such a multiple layered structure then, the indices of refraction of elements 42, 44. ... and 47 are selected to be substantially different from those of the elements with which they are bonded, i.e., element 42 has a substantially different index of refraction from those of either elements 41 and 43, element 44 has a substantially different index of refraction from those of elements 43 and 45, .. . etc. Accordingly, a relatively thick structure can be formed from a plurality of embossed or topographical relief structures as shown to provide varying characteristics covering a range of characteristics between those of "thin" laminated holograms to those of "volume" laminated holograms depending on the optical characteristics desired.

The particular shape of the relief pattern used need not be limited to that shown in the figures. Thus, the pattern may have a saw-tooth wave, a triangular wave, a sine wave, or a square wave configuration, or other suitable configuration, as desired.

All of the structures depicted in FIGS. 3-7, for example, are useful and provide a desired operation with respect to incoming radiation over a relatively wide range of incidence angles, such range tending to be controllable by the number of layers of elements which are utilized. As the effective thickness, e.g., the number of layers, is increased, for example, the ability of the structure to control the transmitted radiation so as to maintain the selected direction toward which the radiation is directed becomes more effective, although there is a tendency to reduce somewhat the range of incidence angles which may be accepted thereby. On the other hand, as the effective thickness and number of layers is decreased, the angle of acceptance of incoming radiation tends to increase, while the ability to maintain the exact direction of the desired illuminating radiation independent of the angle of incidence may be somewhat lessened. For any particular application the effective thickness and/or number of layers can be selected in accordance with whatever characteristics are to be emphasized in that application.

Figure 8:
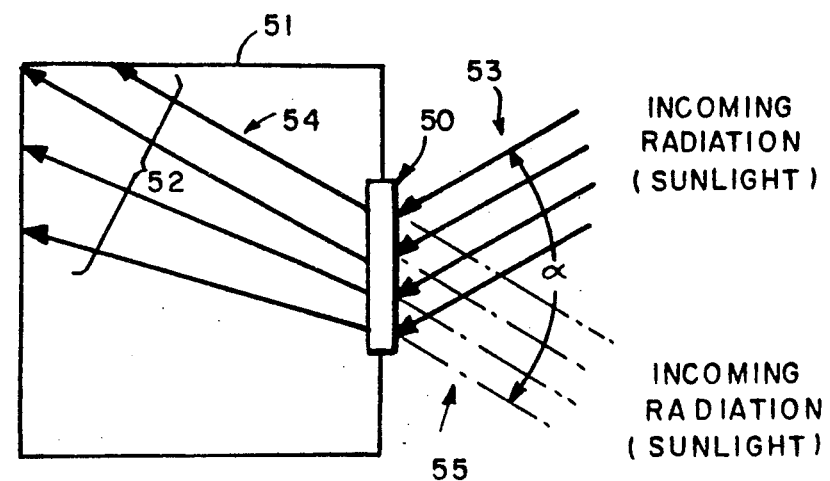
FIG. 8 shows a diagrammatic plan view of an exemplary environment in which a diffracting structure of the invention can be used.

One such exemplary application is shown diagrammatically in the plan view of FIG. 8 wherein a room 51 has a window 50 formed in accordance with the multi-layered structural technique of the invention, as discussed above. As can be seen, when using such structure, incoming radiation from a direction, for example, indicated by arrows 53 is accepted by structure 50 and is directed generally toward an interior region 52 of the room in a direction as shown by arrows 54. It is found that, in utilizing the structure of the invention, incoming radiation at a substantially different incidence angle, as depicted by arrows 55, for example, (or at angles between 53 and 55) is still directed generally toward the same direction i.e., toward region 52, such direction remaining within relatively confined limits independent of which direction the incoming radiation is received within the substantially large angular range thereof, as depicted. In such an embodiment the incoming radiation, for example, may be sunlight in which case as the sun moves from incidence angle 53 to incidence angle 55 the general direction 54 within the interior of room 51 toward the region which is to be illuminated remains effectively within established limits. Moreover the same effect is achieved for incoming radiation over a range of incident angles which are orthogonal to the direction shown in FIG. 8. Thus, the direction 54 remains substantially constant for incoming radiation the direction of which changes in azimuth (in FIG. 8) and in elevation (orthogonal to the direction in FIG. 8)

While the structures discussed above preferably utilize multi-layered elements having topographical diffraction relief patterns on one or more surfaces thereof it is possible to use multi-layered elements having selected diffraction characteristics which do not depend on surfaces having relief patterns but which are achieved using holographic interference patterns formed in the elements using known hologram techniques. Such elements can then be formed as laminate structures in which adjacent elements have different indices of refraction as discussed above for structures using relief patterns.

Figure 9:
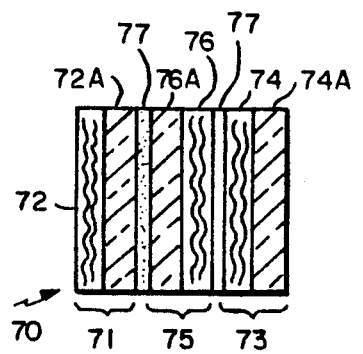
FIG. 9 shows a view in section of a further exemplary embodiment using a plurality of laminated hologram elements which do not use topographical relief patterns thereon.

Thus, as shown in FIG. 9 for a basic three element laminated structure 70, a first outer hologram element 71 has a diffraction interference pattern formed in the region 72 of a substrate 72A using known holographic techniques, and a second outer hologram element 73 has a diffraction interference pattern formed in the region 74 of a substrate 74A. An intermediate hologram element 75 has a diffraction interference pattern formed in the region 76 of a substrate 76A, intermediate element 75 preferably having an index of refraction different from those of elements 71 and 73, but not necessarily so, and being bonded to outer elements 71 and 73 using suitable adhesive bonding layers 77 having indices of refraction which may or may not match those of the elements to which they are bonded. The three layered structure of FIG. 9 can also be extended to a larger number of layers as desired in a manner such as discussed with reference to FIG. 7.

Figure 10:
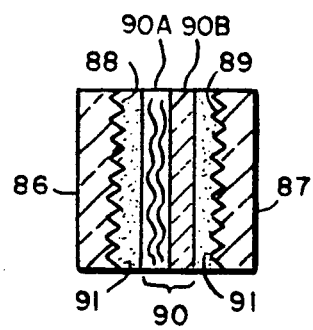
FIG. 10 shows a further exemplary embodiment using a plurality of diffracting elements representing a combination of elements with or without topographical relief patterns therein.

Moreover, hybrid laminated structures, i.e., ones utilizing layered combinations of elements having both topographical relief patterns and non-topographical hologram diffraction patterns, can be used, as shown in FIG. 10, wherein outer diffracting elements 86 and 87 have topographical relief patterns 88 and 89 while intermediate hologram element 90 has a non-topographical holographic interference diffraction pattern 90A in a substrate 90B and an index of refraction which may or may not be different from those of such outer elements (although normally it is). Element 90 is suitably bonded to outer elements 86 and 87 by adhesive layers 91 in which case the adhesive layers are selected to have indices of refraction which differ from those of the outer elements 86 and 87 and contribute to the diffraction effects.

Figure 11:
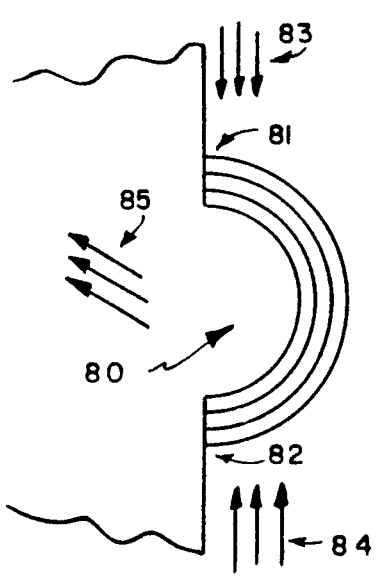
FIG. 11 shows an alternative embodiment of a diffracting structure of the invention for further enhancing the range of incidence angles of incoming radiation to which the device responds.

The substantially planar window configuration depicted in FIG. 8 for providing illumination of the interior of a room can be modified to further enhance the ability of such a window structure to accept incoming radiation over an even wider range of incidence angles in the manner shown in the plan view of FIG. 11. As can be seen therein, the window structure can be formed in an non-planar, or effectively three dimensional, form. In the particular embodiment shown, a laminated structure in the accordance with the invention is depicted substantially in the form of a semi-cylindrical configuration 80 for enhancing the acceptance of incoming radiation in an azimuth direction. As used herein the term "cylindrical" shall be taken to mean, in a general sense, the locus of a line in a translation through space and in the case of FIG. 11 the locus is effectively a semi-circle to form the configuration 80. The configuration of the aperture formed by semi-cylinder structure 80 permits light, e.g., sunlight, which would normally not be capable of acceptance by a planar window surface to be accepted by the semi-cylindrical surface and re-directed toward the desired interior region in the direction of arrows 85 in accordance with the selected diffraction effects thereof. The range of incidence angles is thereby extended effectively to capture incoming radiation incident from an angle depicted by arrows 83 to an angle depicted by arrows 84, effectively a range of almost 180° or so. To extend the incidence angle range in elevation as well as in the azimuth direction the laminated window structure can be formed, for example, in the shape of a hemisphere, or portion thereof. Such structure accepts a larger cross section of incident radiation than a flat window structure and, thus, gathers more light energy for the same window cross section. Other three-dimensional configurations for enhancing the operation in such manner can also be devised for such purpose or for other special purposes in accordance with the invention.

The principle of operation of the laminated structures described above can be described as follows for a better understanding thereof. For example, with reference to the embossed (topographical relief) structures, such patterns can be relatively deeply embossed to make such patterns somewhat specific in their responses to specified ranges of incidence angles. Each embossed layer essentially becomes non-active outside its specified range. Thus, a first embossed layer is active over a first specified range of incidence angles, while a second embossed layer which is inactive for the first range becomes active for a second specified range over which the first layer is inactive. When the second layer becomes inactive, a previously inactive third layer becomes active, and so on for a multi-layer lamination. Thus, if a very wide range of incidence angles is expected to be redirected by the structure, a plurality of embossed layers is required to be responsive to various specified ranges (or sub-ranges) of incidence angles throughout the overall range thereof. In such embodiments adjacent layers may be used to respond to adjacent sub-ranges of incidence angles.

Figure 15:
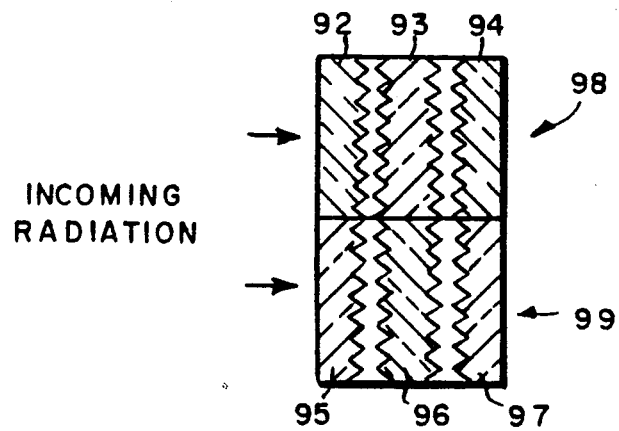
FIG. 15 shows another alternative embodiment of the invention for achieving substantially even illumination efficiency.
Figure 16:
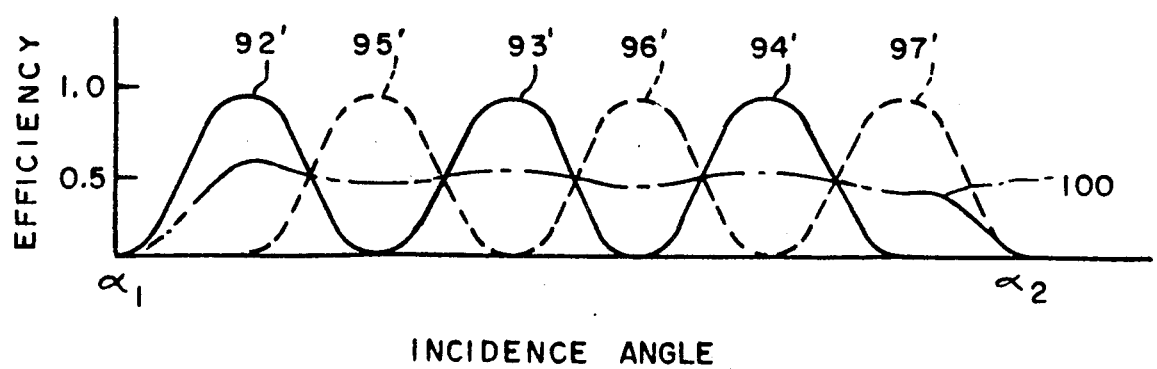
FIG. 16 shows a graph which qualitatively depicts the efficiency response of the embodiment of FIG. 15 over a range of incidence angles.

Another innovative embodiment of the invention can be described for achieving substantially even illumination (e.g., approximately the same illumination intensity) over a desired wide range of incidence angles. A modification of previously described structures can be used to obtain more flexibility of the response to incidence angle variations and to assure a more even illumination efficiency within that variation. A structure for such purpose is shown in FIG. 15. Such a structure comprises a pair of three element stacks 98 (having layers 92, 93 and 94) and 99 (having layers 95, 96 and 97), e.g., each of the type having a topographical relief pattern on each side thereof. The stacks are vertically arranged with respect to the incoming radiation, as shown. In such structure the layers of each stack are arranged to respond to incoming radiation at different ranges of incidence angles, as above, except that the response to adjacent ranges thereof does not occur at adjacent layers but rather sequentially at corresponding layers of each stack. Thus, layer 92 of stack 98 responds to a first range of incidence angles, layer 95 of stack 99 responds to a second adjacent range of incidence angles, layer 93 of stack 98 to the next adjacent range of incidence angles, layer 96 of stack 99 to the next adjacent range of incidence angles, and so on. Such responses are shown by the solid line curve for responses 92', 93' and 94' and by the dashed line curve for responses 95', 96', 97' in FIG. 16. The efficiency of the overall response is represented by the average of the responses of each layer at each incidence angle, shown by the dot-dash curve 100 over a total incidence angle range from $\alpha_1$ to $\alpha_2$. As the first layer 92 of stack 90 becomes inactive, the first layer 95 of stack 91 becomes active, then the second layer 93 of stack 90 becomes active as layer 95 becomes inactive, and so on, the sequentially active layers being effectively well separated from each other. Such response operation has been found to provide a more even illumination of a target area over the range of incidence angle changes, although in such structure the efficiency may tend to be less since effectively only half of the structure is active at any one time. While such a structure is shown with reference to the use of topographical relief pattern layers, the principle involved can also be used with hologram layers or hybrid structures discussed above.

Figure 12:
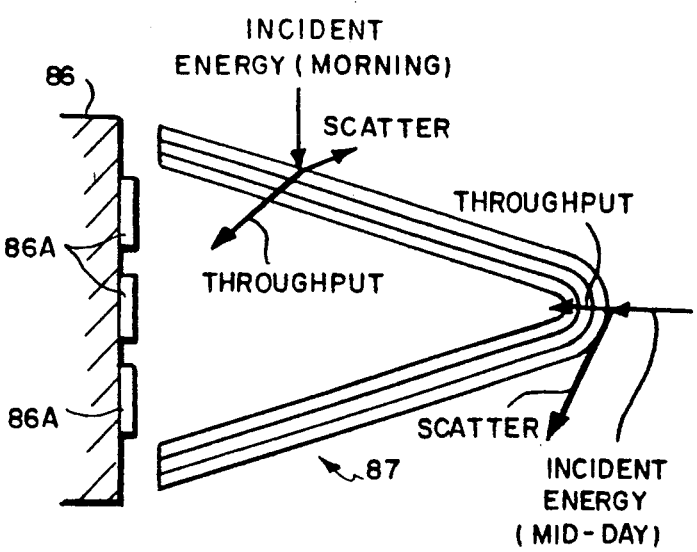
FIG. 12 shows still another application in which the diffracting structure of the invention can be used.

Although the invention is depicted in one application for providing interior illumination of a room, it can also be useful in other contexts or applications. For example, in solar energy conversion systems which use arrays of parallel-connected photo-voltaic cells responsive to solar radiation for producing electrical energy, it is desirable that the solar radiation be directed toward such arrays throughout the daylight hours independent of the angle of incidence thereof. A structure of the type generally discussed above can be used to achieve such purpose as depicted in FIG. 12 wherein solar energy radiation is accepted over an enhanced range of incidence angles by a three-dimensional holographic structure 87, for example, which directs such radiation toward arrays of photo-voltaic energy conversion cells 86A (and their associated circuitry) placed on a suitable substrate 86 for producing a substantially continuous supply of electrical energy throughout the day.

Figure 13:
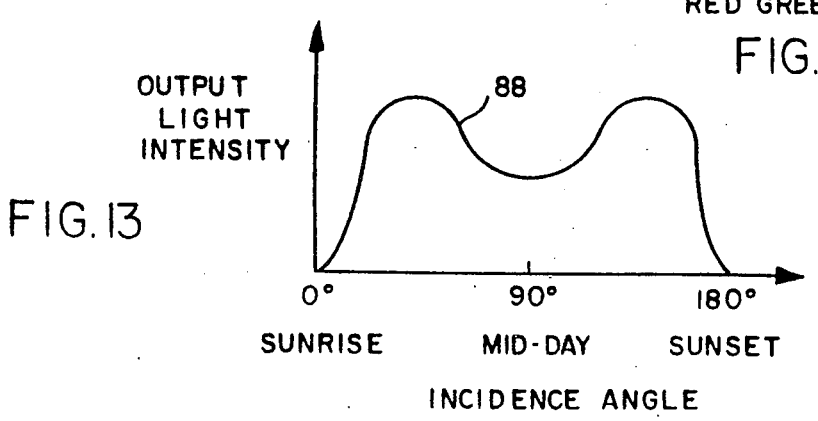
FIG. 13 is a graph depicting a curve of output light intensity vs. input incidence angle useful in explaining the operation of a particular embodiment of the type shown in FIG. 12.

In some cases it may be desirable to produce more electrical energy at certain times of the day than others, e.g., during the early morning and late afternoon hours for electrical lighting or heating purposes. In such applications, for example, the shape and diffraction characteristics of the window structure may be arranged so that the angle of incidence of radiation in the early morning hours and late afternoon hours of the day is such as to maximize the throughput of solar energy onto the surface of the photovoltaic cells, thereby maximizing the production of electrical energy during these hours when peak loads are likely to be experienced, effectively shifting peak production of electricity to those hours where it is most valuable. In the configuration shown in FIG. 12 the cylindrical surface of the holographic structure 87 forms the generally triangular shape depicted. The general operation thereof is illustrated in FIG. 13 by the curve 88 of output light intensity for such a structure as a function of the time of day. Thus, incident energy during the morning hours provides more throughput, or output light intensity, than at mid-day, as exemplarily shown in FIG. 12 as well as in FIG. 13.

Moreover, in such a structure it may be possible to use the incoming sunlight radiation more effectively if the cells can be suitably selected using the following principles. It is known that certain large bandgap semiconductor cells, e.g., GaAs single crystal p-n junction devices, tend to absorb less radiation in the red and near infra-red portion of the spectrum (the longer wavelength and of the light spectrum) than they do in the shorter wavelength (blue/violet) end thereof. On the other hand, narrow bandgap devices, e.g., silicon semiconductor devices, tend to have peak conversion efficiency in the infra-red region of the spectrum and tend to convert shorter wavelength energy much less efficiently.

Figure 14:
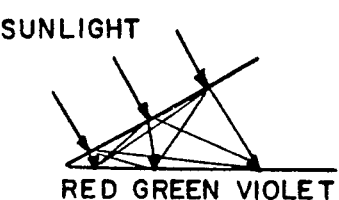
FIG. 14 shows a diagram demonstrating the operation of a particular embodiment useful in the application depicted in FIG. 12.

Thus, when using a diffracting structure having the operation illustrated in FIG. 14, wherein the incoming sunlight radiation produces a spectrum of energy from the red (longer wavelengths) to violet (shorter wavelengths), if the position of such spectrum can be maintained reasonably constant, appropriate energy conversion cells can be placed so that, for example, the bandgap devices that are most efficient for long wavelength light (e.g., silicon cells), can be placed generally in the red region. Those more efficient in the intermediate green region (e.g., $Ga_{1-x}Al_xAs$ cells) can be so positioned and those that are most efficient in the blue-violet region (GaAs cells) can be accordingly positioned. Therefore, as long as the spectral distribution of the incoming radiation can be arranged so as not to vary appreciably with time (e.g., during the course of a day and from season to season) by using the invention, the most effective energy conversion can be achieved.

While the above embodiments are specifically discussed as representative of the invention and the uses thereof, further modifications thereof within the spirit and scope of the invention may occur to those in the art. Hence the invention is not to be construed as limited thereto except as defined by the appended claims.

What is claimed is:

1. A structure for responding to incoming radiation having a range of wavelengths incident thereon within a selected range of incidence angles and for directing such incident radiation in a selected direction from said structure, said structure comprising at least two diffracting elements each having at least one diffraction grating surface;

the grating spacings and depths of one of said at least two diffracting elements being selected to diffract incoming radiation, incident thereon within a first portion of said selected range of incidence angles, in a selected direction; the grating spacings and depths lying within a range which is substantially the same order of magnitude as the range of wavelengths of said incoming radiation;

the grating spacings and depths of said at least one other of said at least two diffracting elements being selected to diffract incoming radiation, incident thereon within another portion of said selected range of incident angles, in generally the same selected direction; the grating spacings and depths lying within a range which is substantially the same order of magnitude as the range of wavelengths of said incoming radiation;

an intermediate region having an index of refraction different from that of said at least two diffracting elements being positioned between said at least two diffracting elements, and interfacing said at least two diffracting elements at the at least one diffraction grating surfaces thereof;

said at least two diffracting elements and said intermediate region being responsive to the radiation incident on said structure so that substantially all of the incident radiation within said selected range of incident angles is transmitted through said structure, the diffraction of the incoming radiation at the diffraction grating surfaces of said at least two diffracting elements thereby causing said incoming radiation to be transmitted from said structure generally in said selected direction which remains within relatively limited confines independent of the angle of incidence of said incoming radiation over said selected range of incidence angles.

2. A structure in accordance with claim 1 wherein said intermediate region is air.

3. A structure in accordance with claim 1 wherein said intermediate region is formed by an intermediate element having an index of refraction different from that of said two elements and being bonded to said two elements to form a laminated structure therewith.

4. A structure in accordance with claim 1 wherein the diffraction grating of said two elements are each in the form of a topographical diffraction relief pattern formed on at least one surface thereof.

5. A structure in accordance with claim 3 wherein the diffraction gratings of said two elements are each in the form of a topographical relief pattern formed on at least one surface thereof and said intermediate element also has a topographical diffraction relief pattern formed on at least one surface thereof.

6. A structure in accordance with claim 3 wherein said at least two elements are holograms each having selected holographic interference patterns forming the diffraction gratings thereof and said intermediate element is a hologram having a selected holographic interference pattern forming a diffraction grating thereof.

7. A structure in accordance with claim 3 wherein the diffraction gratings of said two elements are each in the form of a topographical relief pattern formed on at least one surface thereof and said intermediate element is a hologram having a selected holographic interference pattern forming a diffraction grating thereof.

8. A structure in accordance with claim 3 and further including adhesive layers between said two elements and said intermediate element for bonding said elements to form said laminated structure.

9. A structure in accordance with claim 3 wherein the material of said intermediate element is used to bond said intermediate element directly to said two elements.

10. A structure in accordance with claim 2 and further including means for attaching said two elements together so as to enclose said intermediate air region therebetween.

* * * * *